C. M. PITEL.
CHANDELIER HOOK.
APPLICATION FILED AUG. 31, 1908.
913,977.
Patented Mar. 2, 1909.
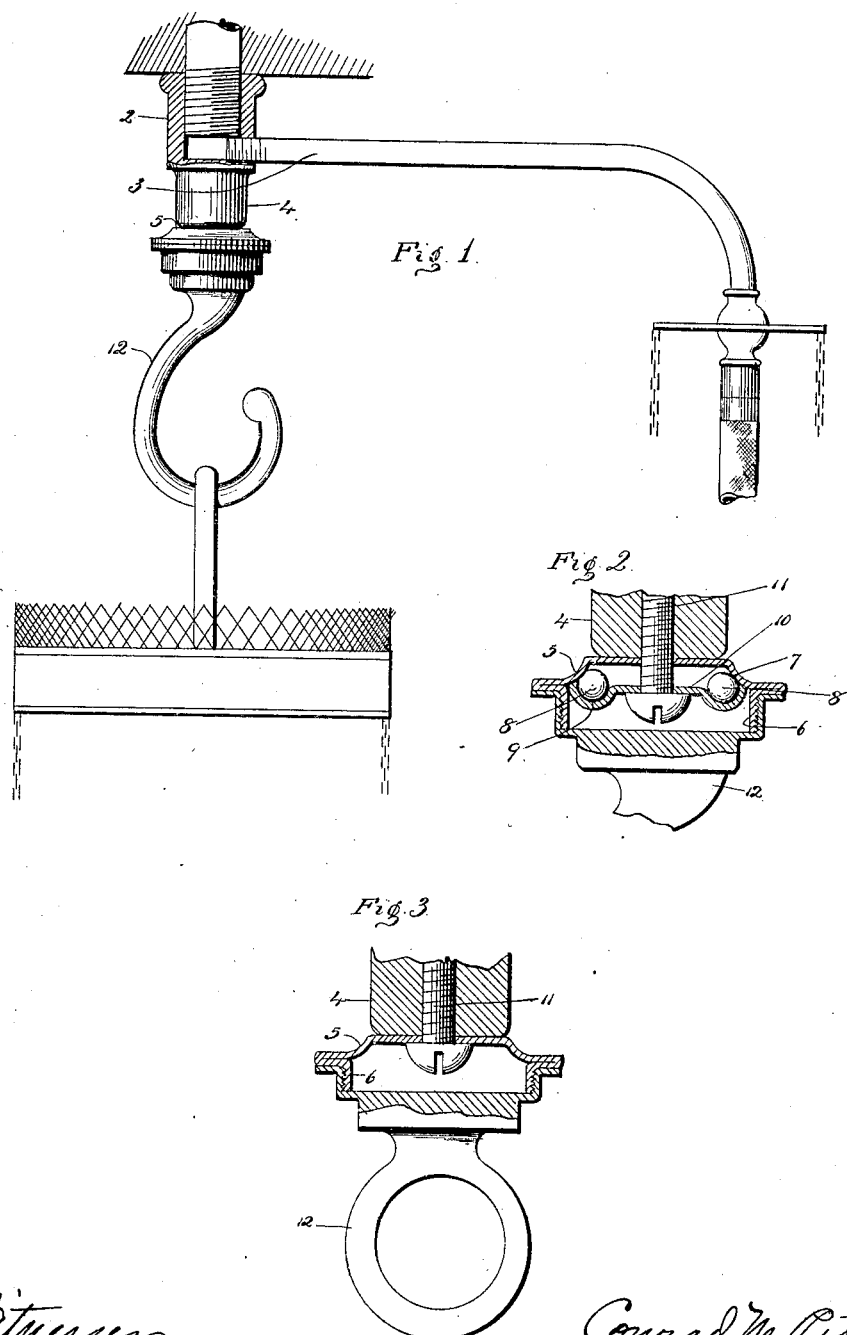

UNITED STATES PATENT OFFICE.

CONRAD M. PITEL, OF MERIDEN, CONNECTICUT.

CHANDELIER-HOOK.

No. 913,977.   Specification of Letters Patent.   Patented March 2, 1909.

Application filed August 31, 1908. Serial No. 451,079.

*To all whom it may concern:*

Be it known that I, CONRAD M. PITEL, a citizen of the United States, residing at Meriden, in the county of New Haven and State of Connecticut, have invented a new and useful Improvement in Chandelier-Hooks; and I do hereby declare the following, when taken in connection with the accompanying drawings and the numerals of reference marked thereon, to be a full, clear, and exact description of the same, and which said drawings constitute part of this specification, and represent, in—

Figure 1 a side view partly in section of a chandelier hook constructed in accordance with my invention and shown as supporting the top of an extension fixture in connection therewith, and a flexible gas pipe connected with the nipple. Fig. 2 a sectional view on an enlarged scale showing the proper form of the swivel between the suspension member and the nipple. Fig. 3 a side view partially in section illustrating a modified form of chandelier hook.

This invention relates to an improvement in chandelier hooks for extension chandeliers or hanging lamps, that is, hooks which are adapted to be connected with the nipple of a gas pipe, and from which a gas or electric fixture may be suspended.

In the usual construction of chandelier hooks, these hooks are rigid with relation to the nipple, but in the use of extension fixtures for gas or electricity, the flexible conductor attached to the arm projecting from the nipple, is carried down at one side of the lamp, and it is desirable when the fixture is in its raised position, to wind the conductor around the band of the lamp, which is provided with hooks to support the conductor.

The object of this invention is to provide the nipple with a swivel member so that the chandelier or lamp may be turned; and the invention consists in the construction hereinafter described and particularly recited in the claims.

In carrying out my invention I employ a nipple 2 internally threaded and adapted to close the end of a gas pipe and provided with a tubular arm 3 which may be a gas pipe or tube to hold electric light wires or flexible conductors at one side of the chandelier. The lower end of the nipple has a solid extension 4 and seated against the bottom of this extension is a plate 5 having a downwardly extending externally threaded flange 6 and formed with an internal bearing face 7 to rest upon a series of balls 8 arranged in the groove 9 of a disk 10 which is secured to the extension 4 by a screw 11. The suspension member 12 may be in the form of a hook, as shown in Fig. 1 of the drawings, or in the form of an eye as shown in Fig. 3 of the drawings, and this member is cup-shaped at its upper end and internally threaded to engage with the threads on the flange 6 and so that the suspension member is coupled with the plate 5 which is free to be turned, bearing on the balls 8. Instead, however, of providing the antifriction balls 8 the plate 5 may be swiveled to the extension 4 by the screw 11 which will be turned into the extension 4 so as to bring the plate 5 substantially to a bearing against the lower end of the extension, yet leave it free to turn on the screw, as shown in Fig. 3 of the drawings.

By the term "chandelier hook" as used, I wish to be understood as including either a hook proper or an eye.

I claim:—

1. A chandelier hook comprising an internally threaded nipple formed at its lower end with an extension, a plate swivelly connected with said extension, said plate formed with a downwardly extending flange and a suspension member, cup-shaped at its upper end for engagement with the flange of said plate, substantially as described.

2. A chandelier hook comprising an internally threaded nipple for attachment to a gas pipe formed at its lower end with an extension, a disk connected with said extension, a plate between said disk and extension, said plate being formed with a downwardly extending flange, anti-friction balls located between the disk and plate, and a suspension member cup-shaped at its upper end for engagement with the flange of said plate, substantially as described.

In testimony whereof, I have signed this specification in the presence of two subscribing witnesses.

CONRAD M. PITEL.

Witnesses:
FREDERIC C. EARLE,
CLARA L. WEED.